United States Patent
Volkov et al.

(10) Patent No.: US 11,334,247 B2
(45) Date of Patent: May 17, 2022

(54) SYSTEMS AND METHODS FOR A SCALABLE DE-DUPLICATION ENGINE

(71) Applicant: Acronis International GmbH, Schaffhausen (CH)

(72) Inventors: Oleg Volkov, Moscow (RU); Andrey Zaitsev, Moscow (RU); Kirill Korotaev, Moscow (RU); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 58 days.

(21) Appl. No.: 17/037,963

(22) Filed: Sep. 30, 2020

(65) Prior Publication Data

US 2021/0026536 A1 Jan. 28, 2021

Related U.S. Application Data

(63) Continuation of application No. 16/435,701, filed on Jun. 10, 2019, now Pat. No. 10,877,666.

(51) Int. Cl.
*G06F 3/06* (2006.01)
*G06F 16/901* (2019.01)

(52) U.S. Cl.
CPC ............ *G06F 3/0607* (2013.01); *G06F 3/067* (2013.01); *G06F 3/0641* (2013.01); *G06F 16/9014* (2019.01)

(58) Field of Classification Search
CPC ...... G06F 3/0607; G06F 3/0641; G06F 3/067; G06F 16/9014; G06F 3/061; G06F 3/0608
See application file for complete search history.

(56) References Cited

U.S. PATENT DOCUMENTS

| | | | | |
|---|---|---|---|---|
| 4,758,951 A | * | 7/1988 | Sznyter, III | G06F 12/109 711/206 |
| 2017/0249090 A1 | * | 8/2017 | Arcangeli | G06F 3/0641 |
| 2017/0293450 A1 | * | 10/2017 | Battaje | G06F 3/0608 |
| 2018/0032261 A1 | * | 2/2018 | Singhai | G06F 3/0608 |
| 2018/0349053 A1 | * | 12/2018 | Battaje | G06F 12/0891 |
| 2020/0249860 A1 | * | 8/2020 | Faibish | G06F 3/0673 |
| 2020/0387317 A1 | * | 12/2020 | Volkov | G06F 16/152 |
| 2021/0240376 A1 | * | 8/2021 | Volkov | G06F 3/0653 |

* cited by examiner

*Primary Examiner* — Sean D Rossiter
(74) *Attorney, Agent, or Firm* — ArentFox Schiff LLP; Michael Fainberg

(57) ABSTRACT

Disclosed herein are systems and method for de-duplicating blocks of data. In one aspect, an exemplary method comprises receiving a block of data at a de-duplication engine that comprises a first block node and a first page node, wherein the first block node stores a single block descriptor for at least two identical blocks previously received and wherein the first page node stores single instances of identical pages in the at least two identical blocks. The method comprises comparing the received block with the at least two identical blocks. In response to determining that the received block partially matches the at least two identical blocks, the method comprises storing a block descriptor of the received block in a second block node and storing at least one page that matches between the received block and the at least two identical blocks in a second page node of the de-duplication engine.

20 Claims, 13 Drawing Sheets

SYSTEMS AND METHODS FOR A SCALABLE DE-DUPLICATION ENGINE

CROSS-REFERENCE TO RELATED APPLICATIONS

This application is a continuation of and claims the benefit of U.S. Non-Provisional application Ser. No. 16/435,701, filed Jun. 10, 2019, which is herein incorporated by reference.

FIELD OF TECHNOLOGY

The present disclosure relates to the field of distributed block storage of data, and, more specifically, to systems and methods scalable offline de-duplication for software defined distributed block storage.

BACKGROUND

De-duplication of storage data refers to a method of finding identical data fragments in storage and storing only a single copy of each such fragment—thereby eliminating duplicates. De-duplication techniques are typically applied for archived data or Virtual Machines (VM) images, where there is a high probability of finding substantial amount of duplicated data.

The de-duplication of archival storage is typically performed online while processing new data. For online de-duplication, content-based chunking techniques are proven as being the most effective. However, online de-duplication involves significant processing overhead and adversely impacts storage writing performance. In order to reduce the impact on storage writing performance, offline de-duplication techniques are used for de-duplication of VM images. During offline de-duplication, the data is processed after being written to the storage.

The most common offline de-duplication technique is based on splitting data onto page-sized blocks (4k bytes in size), finding some hash of the content of the block, and locating identical blocks. The locating of identical blocks includes first comparing hash values, and then checking the content of the blocks having similar hashes for an exact match. Applying such technique to large scale distributed software defined storage creates many challenges. First, comparing every page-sized block to every other block does not scale well. Second, making the storage of the de-duplicated data scalable is not a trivial task. Third, locating and removing data that is no longer needed is especially hard problem for a distributed de-duplicated storage system. In order to accomplish the removal of data that is no longer needed, the system has to maintain reference count for every data fragment, which is not feasible in a distributed system without significant performance and storage overhead.

Therefore, there is a need for a scalable offline de-duplication method and system that addresses the shortcomings described above.

SUMMARY

Aspects of the disclosure relate to the field of distributed block storage of data. In particular, aspects of the disclosure describe methods and systems for scalable offline de-duplication of data for a distributed software defined block storage.

In one exemplary aspect, a method for de-duplicating blocks of data, by a de-duplication engine implemented in a computing device comprising a processor, the method comprising: for each previously de-duplicated block of data of a de-duplication engine, storing de-duplicated pages references by hashes and a block descriptor, creating a set of hash components of the previously de-duplicated blocks, and for each newly received block of data for de-duplication, calculating a translation tolerant hash vector including a predetermined number of hash components, determining a similarity of the received block to the previously de-duplicated blocks based on a comparison of the hash components of the received block with the hash components in the set, and when the received block is determined as being similar to the previously processed blocks based on the comparison, storing the block without duplication in the de-duplication engine, including pages of the block referenced by hashes and a block descriptor.

According to one aspect of the disclosure, a system is provided for de-duplicating blocks of data, the system comprising at least one processor configured to: for each previously de-duplicated block of data of a de-duplication engine, store de-duplicated pages references by hashes and a block descriptor, create a set of hash components of the previously de-duplicated blocks, and for each newly received block of data for de-duplication, calculate a translation tolerant hash vector including a predetermined number of hash components, determine a similarity of the received block to the previously de-duplicated blocks based on a comparison of the hash components of the received block with the hash components in the set, and when the received block is determined as being similar to the previously processed blocks based on the comparison, store the block without duplication in the de-duplication engine, including pages of the block referenced by hashes and a block descriptor.

In one exemplary aspect, a non-transitory computer-readable medium is provided storing a set of executable instructions thereon for de-duplicating blocks of data, including instructions for each previously de-duplicated block of data of a de-duplication engine, storing de-duplicated pages references by hashes and a block descriptor, creating a set of hash components of the previously de-duplicated blocks, and for each newly received block of data for de-duplication, calculating a translation tolerant hash vector including a predetermined number of hash components, determining a similarity of the received block to the previously de-duplicated blocks based on a comparison of the hash components of the received block with the hash components in the set, and when the received block is determined as being similar to the previously processed blocks based on the comparison, storing the block without duplication in the de-duplication engine, including pages of the block referenced by hashes and a block descriptor.

In one aspect, the received block is determined as being similar to the previously processed blocks when the number of hash components of the received block contained in the set of hash components exceeds a predetermined threshold.

In one aspect, the predetermined number of hash components are evenly distributed by stripping high order bits from hashes of pages, and selecting the predetermined number of hash components based on remaining bits of the hashes.

In one aspect, the de-duplication engine is scalable.

In one aspect, each block consists multiple pages. For example, the block of data may contain 256 pages, making each block about 1 Mbyte in size.

In one aspect, the similarity of the received block with previously processed blocks is determined using a scalable Bloom filter.

In one aspect, the method further includes periodically removing data and objects of the de-duplication engine that are no longer needed.

In one aspect, the method further includes updating the set of hash components when the received block is added to a storage of the de-duplicated engine.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for a scalable offline de-duplication of data fragments. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
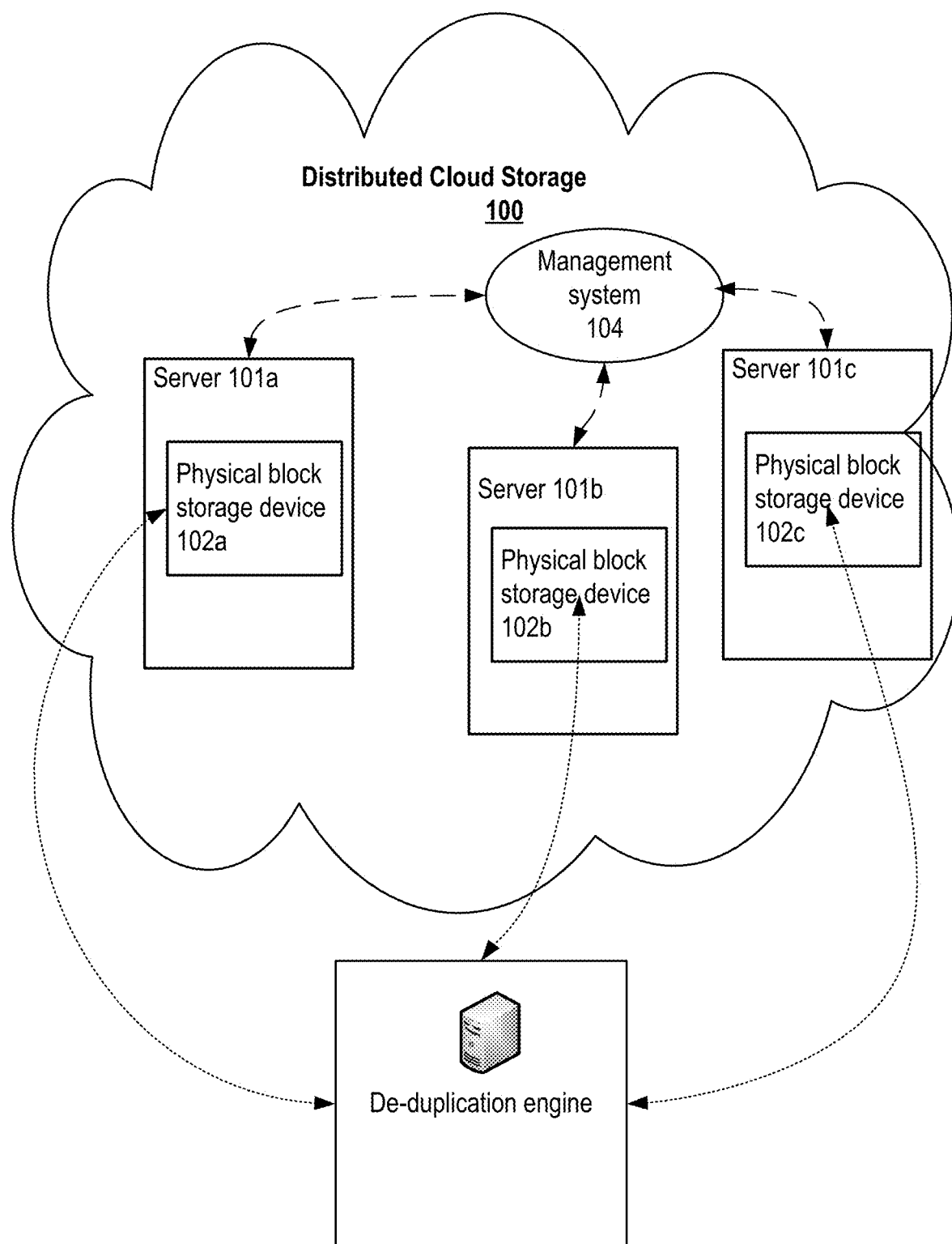
FIG. 1 is a block diagram illustrating a system for offline de-duplication in a distributed cloud storage.

FIG. 1 is a block diagram illustrating a system for offline de-duplication in a distributed cloud storage 100. The teachings of the present disclosure are described below for the scenario in which a distributed cloud storage is used for the offline de-duplication. However, without any loss of generality, the offline de-duplication of the present disclosure may be implemented in conjunction with any type of data storage known in the art.

The distributed cloud storage 100 includes a plurality of hardware servers 101a, 101b, ..., 101n (hereafter referred to as physical servers or simply as servers). The distributed cloud storage 100 is monitored and managed by a management system 104 deployed across the plurality of servers 101a, 101b, ..., 101n.

Figure 13:
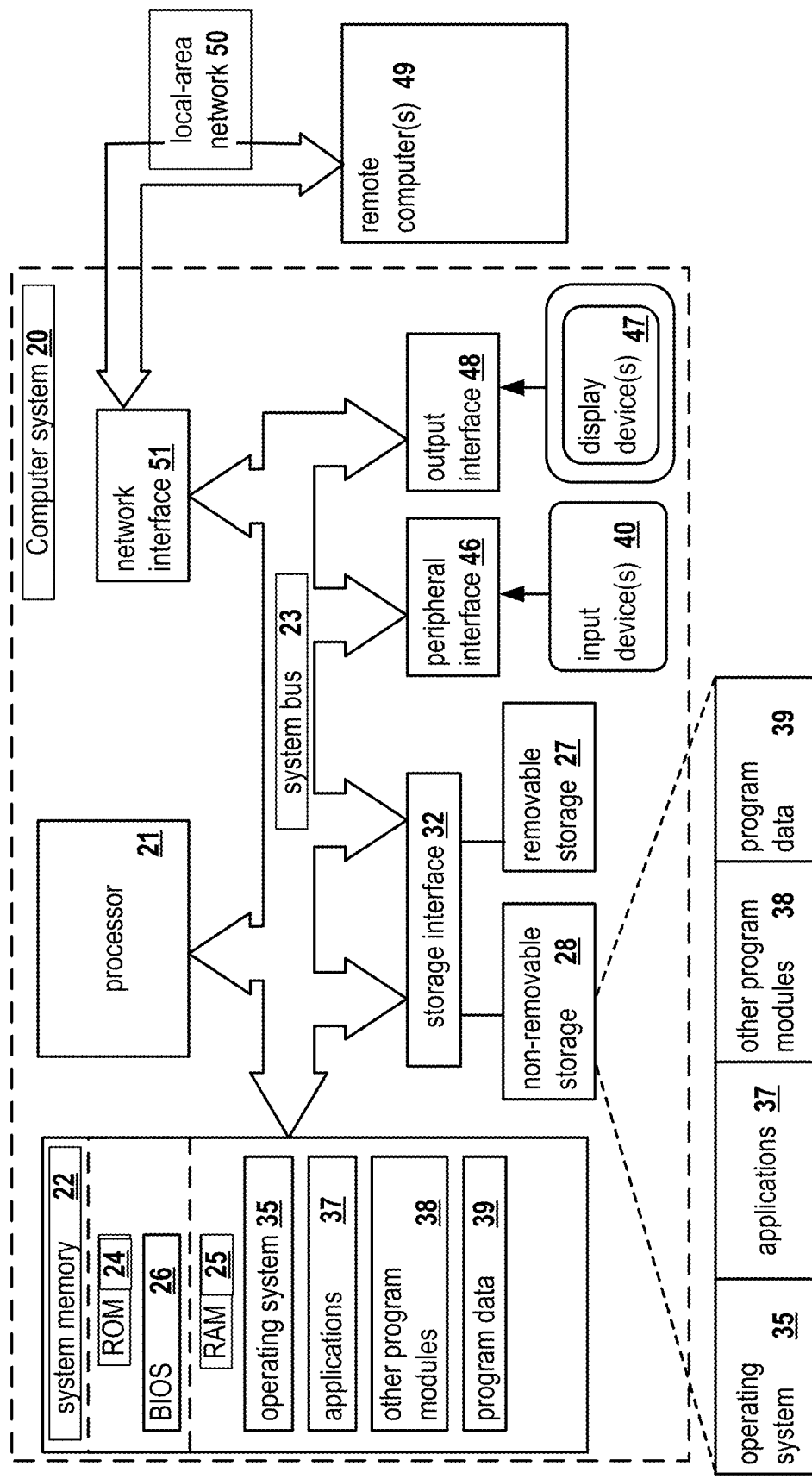
FIG. 13 presents an example of a general-purpose computer system on which aspects of the present disclosure can be implemented.

A server of the plurality of servers 101a, 101b, ..., 101n may comprise any number of physical components (e.g., as shown in FIG. 13). For clarity, only physical components used to illustrate the teachings of the present disclosure are shown in FIG. 1. In other words, a server of the plurality of servers 101a, 101b, ..., 101n comprises a number of physical components, e.g., processors, physical block storage devices (e.g., Hard Disk Drives (HDDs), Solid State Drives (SSDs), flash drives, SMR disks, etc.) or memory (e.g., Random Access Memory (RAM)), I/O interface components, etc. However, only physical block storage devices are shown in FIG. 1.

For the example of FIG. 1, server 101a includes physical block storage devices 102a, server 101b includes physical block storage device 102b, and server 101n includes physical block storage device 102n. The physical servers 101a, 101b, ..., 101n can be used for storing any type of data uploaded to storage, e.g., for storing user data, data of applications, data of Virtual Machines (VM), file systems, files, etc. Furthermore, the storage may contain VM disk images, root file systems, etc. The storage can be a part of a hyperconvergence platform. In general, the distributed cloud storage 100 may include any number of computing devices (e.g., a personal computers, laptops, servers, etc.) that include a computer processing unit ("CPU") and a memory that includes software for performing various tasks, e.g., installing an OS software, rebooting the servers, and so on.

In one aspect, the OS is configured to perform at least one of: serving request sent to the distributed cloud storage 100, and running storage services, e.g., metadata services, chunk services, data replication services, de-duplication, encryption/decryption, backup services, etc. The OS is also responsible for interaction with hardware (e.g., it contains drivers, e.g. for network interface controller). The metadata services handle/maintain and update storage metadata, e.g., which and where data chunks are stored, which clients can access the data chunks (on read/write), etc. The chunk service is responsible for storing data chunks and providing data to clients. The chunk service may also be responsible for data replication (also called for data redundancy).

The data to be de-duplicated in accordance with the teachings of the present disclosure is data stored in the distributed storage, e.g., distributed across any number of physical block storage devices 102a, 102b, ..., 102n which are located on any number of physical devices of the distributed storage, e.g., the servers 101a, 101b, ..., 101n.

As described above, traditional de-duplication techniques use page sized blocks (i.e., blocks of 4k bytes in size). When the block sizes are small, processing efficiency is reduced. In one aspect, the present disclosure describes a de-duplication system that serves large scale storage systems that keep data in large blocks. For example, the storage of the present disclosure may use 1M byte sized blocks, with each block consisting 256 pages. Each of the large blocks are characterized by respective hashes.

In one aspect, the method of the present disclosure determines whether a plurality of blocks are similar (i.e., contain similar content) by comparing the plurality of blocks based on their hashes. In one aspect, the comparison among the plurality of blocks is made using a technique that satisfies translation tolerance properties. In the context of the present disclosure, the "translation tolerance" is a property that is used to gauge whether the similarity detection technique is flexible enough to detect similar blocks when different blocks contain data from a same or a similar data stream, where each block contains the data shifted by a respective different number of pages with respect to a start of the data stream.

Figure 2:
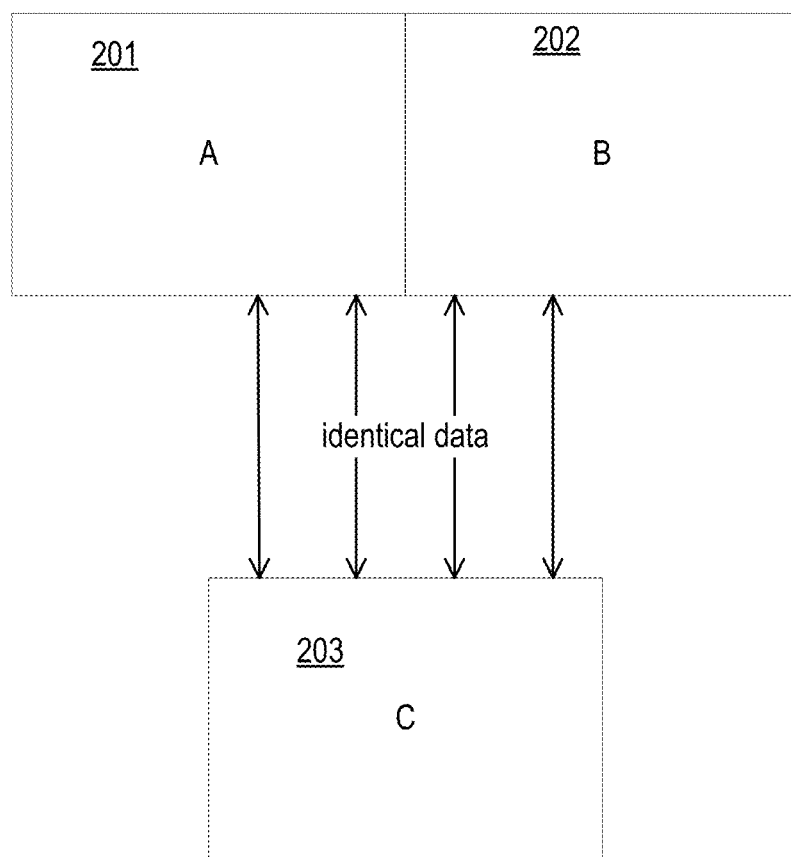
FIG. 2 is a block diagram of an example of matching blocks with different offsets from a start of a data stream.

FIG. 2 is a block diagram of an example 200 of matching blocks with different offsets from a start of a data stream. The example 200 includes blocks 201, 202 and 203 that contain data from the same data stream. Block 203 is shifted with respect to blocks 201 and 202 by some integer number of pages. Note that, in general, the hashes of blocks 201 and 202 are different. However, the similarity detection technique seeks to determine that block 203 is similar to both blocks 201 and 202. At the same time, a hash of block 203 that comprises a single numerical value may be equal to a similar hash of either block 201 or block 202, but not both. As the example illustrates, using a single numerical value as a hash of the block is not enough to characterize block similarity when translation tolerance is also a criteria to be satisfied.

In order to satisfy the translation tolerance criteria, in one aspect, the method of the present disclosure uses a hash vector, $\{fi\}$, of the block, instead of a single numerical value. In other words, instead of the single numerical value described above, the hash of the block of the present disclosure is a "vector" having multiple hash components. In order to describe the hash vector $\{fi\}$ with clarity, the mathematical foundation is first summarized below.

Suppose there are two sets of randomly chosen values $\{A_i\}$ and $\{B_j\}$. Then, the probability of the minimal values in the two sets match equals to a Jaccard index of similarity of the sets, which is defined as: $|\{A\}\cap\{B\}|/|\{A\}\cup\{B\}|$. However, calculating the Jaccard index directly is not a trivial matter. Therefore, the method of the present disclosure applies the Broder theorem to obtain an estimate. The Broder theorem may be used to estimate similarities between two sets of randomly distributed numbers by comparing the minimum (or maximum) values found in the two sets. By applying the Broder theorem, the similarities of $\{A_i\}$ and $\{B_j\}$ may be estimated as: Probability [min ($\{A_i\}$) ==min ($\{B_j\}$)]. In other words, according to the Broder theorem:

$$\text{Probability}[\min(\{A_i\})==\min(\{B_j\})]=|\{A\}\cap\{B\}|/|\{A\}\cup\{B\}|=J(\{A_i\},\{B_j\}).$$

Thus, when the minimum values are equal, the probability is high that the sets of numbers have many elements in common. To estimate the similarity of two blocks of data, the method may then calculate some hash of every page of the block, find minimum hash for every block, and then compare those minimum hashes.

Figure 3:
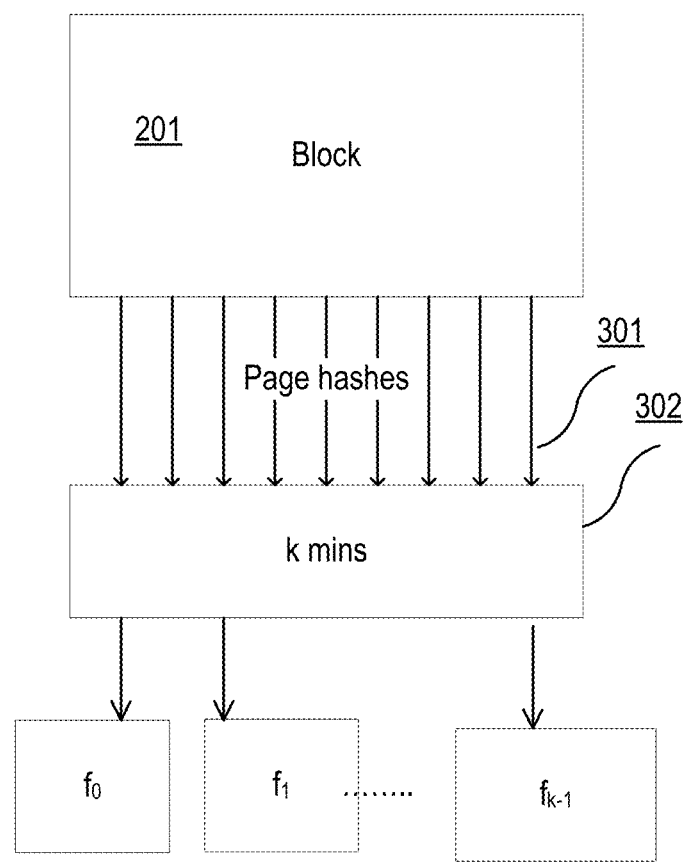
FIG. 3 is a block diagram of an example that illustrates building the hash vector consisting of k minimal hashes of pages of the block.

FIG. 3 is a block diagram of an example 300 that illustrates building the hash vector $\{f_i\}$ consisting of k minimal hashes of pages of the block. The hash vector, when built as shown in FIG. 3, satisfies the translation tolerance criteria. The block 201 includes a large number of pages (e.g., 256 pages). The hashes of the pages are determined, as shown in 301. A subset of the hashes of the pages are to be used for building the hash vector. The hash vector for block 201 may then be: $\{fi\}=[f_0, f_1, f_2, \ldots, f_{k-1}]$, as shown in 302. Given the hash vector $\{f_i\}$, the data of block 201 may be considered similar to data of other blocks, if it has some hash components, $f_i$, matching hash components determined for other blocks. The number of matched hash components provides a measure of similarity between the blocks. The block is likely to have many pages in common with other blocks when all k hash components match those of the other blocks. In comparison, when only a single hash component of the block matches those of the other blocks, the block and the other blocks are less likely to have many pages in common. For example, similarity between blocks 1M bytes in size may be reliably determined using the method of the present disclosure when k=4.

For the example described above, the hash components were chosen as minimum page hash values for the block. Therefore, the hash components are likely to be unevenly distributed. In turn, the uneven distribution of the hash components may increase the probability of collision unless a large number of bits are used for the hashes.

In one aspect, the method of the present disclosure reduces the probability of collision by using secondary hashes of the same pages as hash components—instead of using a large number of bits. In another aspect, the method reduces the probability of collision by using another hash calculated using a primary hash as an input, wherein the primary hash has more bits than required for the hash of the present method. In another aspect, the method enforces an even distribution of the hash components by stripping high order bits from hashes of pages.

Returning to the distributed cloud storage 100 of FIG. 1, in order to implement the offline de-duplication, the present disclosure provides a scalable de-duplication engine whose capacity may be increased by adding more servers, server components, storage capacity, etc.

Figure 4:
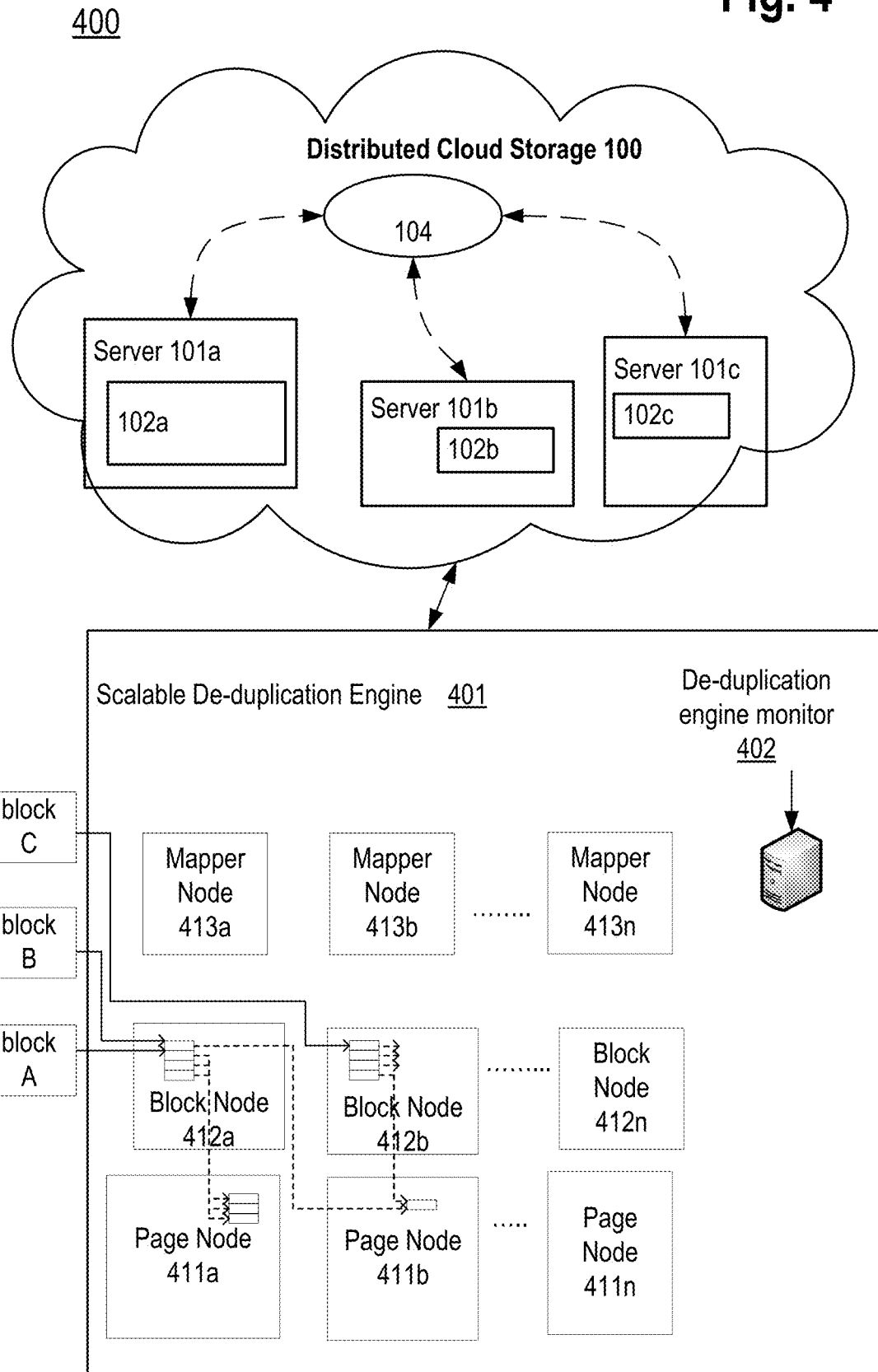
FIG. 4 is a block diagram illustrating an exemplary system with a scalable de-duplication engine for providing offline de-duplication.

FIG. 4 is a block diagram illustrating an exemplary system 400 with a scalable de-duplication engine 401 for providing offline de-duplication. In order to properly deal with the increases and decreases in capacity, the system 400 is built from sharded services. Note that, in data storage technologies, sharding is needed when the dataset is large and cannot be stored in one database, or for building stateful services where the size of the state is too large to be served by a single physical machine. The sharding services enable splitting large homogeneous types of data into multiple databases and scaling in response to a change in a size of a service being built. The sharded services for the scalable de-duplication engine 401 of the present disclosure include three different types of de-duplication engine components: page nodes 411a-411n, block nodes 412a-412n, and mapper nodes 413a-413n. In addition, the system 400 includes a de-duplication engine monitor service 402 that serves as a coordinator for the various operations of the de-duplication engine.

The page nodes 411a-411n are used for storing de-duplicated pages referenced by some hash with enough bits to be considered unique. The page node that stores a particular page is chosen based on the hash value. Namely, the index of a particular page node may be calculated as the hash value modulo of the total number of page nodes.

The block nodes 412a-412n are used to store the list of pages for a particular block (i.e., block descriptors). The block nodes are referenced by some representative hash of the block with enough bits to be considered unique. In the simplest case, the representative hash of a given block may be calculated as the hash of the array of the page hashes of the given block. The node storing the particular block's descriptor is chosen based on the representative hash value. Namely, the index of the particular block node may be calculated as the representative hash value modulo of the total number of block nodes.

The mapper nodes 413a-413n are used for finding (locating) similar blocks and for removing data that is no longer needed. The operations for finding similar blocks are described in conjunction with FIG. 6, and the operations for removing data that is no longer needed are described in conjunction with FIG. 10.

As mentioned above, the de-duplicated pages and the block nodes are referenced by unique hashes. Using unique hashes for addressing blocks and pages has the benefit of automatically: using a single block descriptor for identical blocks, and using a single instance of a page for different blocks having identical pages. Thus, the approach is suitable for de-duplicating blocks as well as de-duplicating pages.

It is noted that all of the shared services of the de-duplication engine 401 use the storage clusters as ultimate physical storage for the de-duplicated data and associated metadata, e.g., for storing the block descriptors. The storage cluster may be the same cluster for which the de-duplication is being performed. Thus, it is important to avoid de-duplicating data stored by the de-duplication engine itself.

Figure 5:
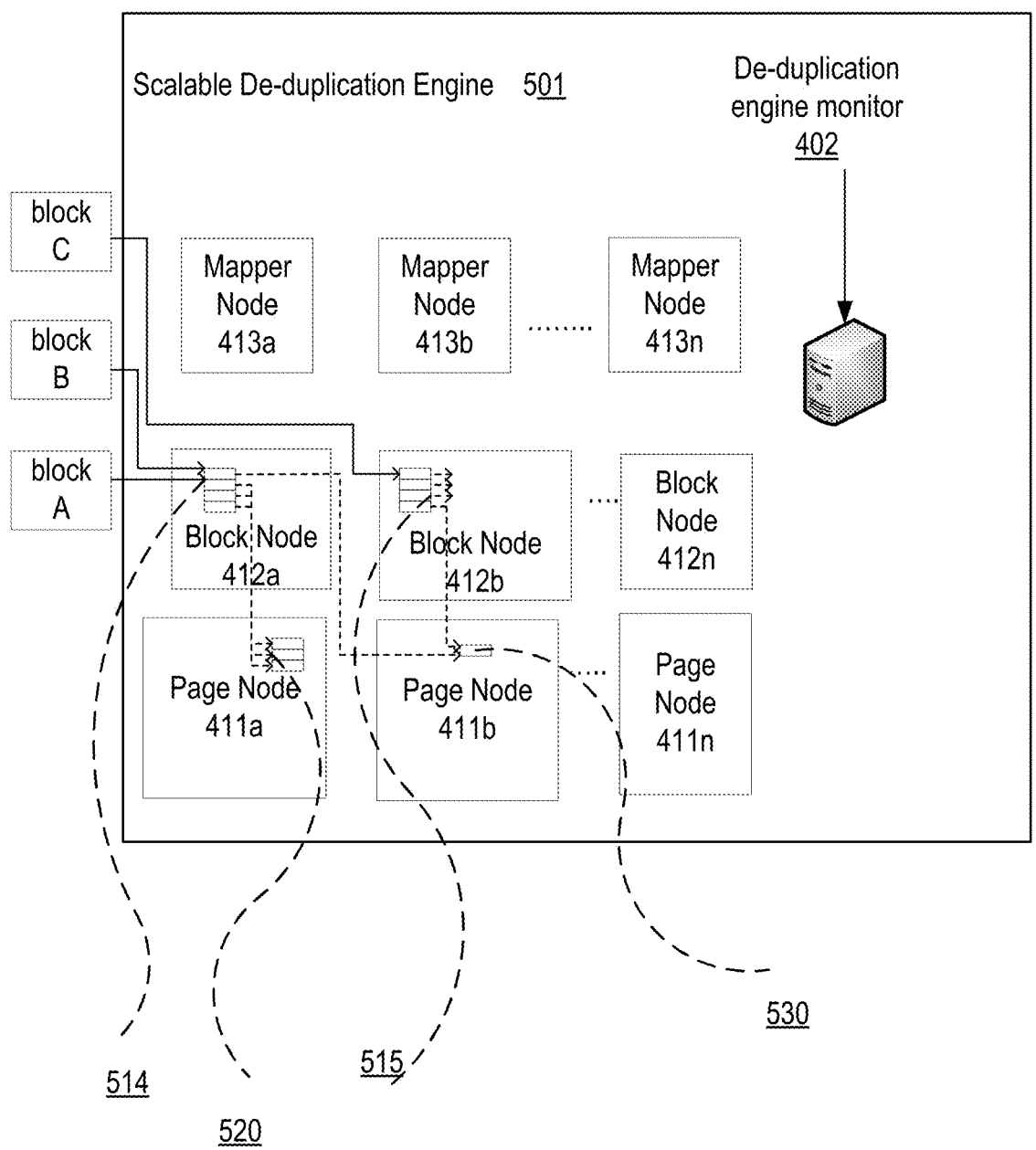
FIG. 5 is a block diagram illustrating an exemplary system where blocks and pages are shared.

FIG. 5 is a block diagram illustrating an exemplary system 500 where blocks and pages are shared. The de-duplication engine 501 is similar to the de-duplication engine 401 of FIG. 4, with the exception of the blocks and pages of FIG. 5 being shared. The de-duplication engine 501 receives blocks of data from the distributed cloud storage 100 (i.e., from the storage cluster). Blocks A and B have identical content. Therefore, blocks A and B have identical representative hash and share the same block descriptor which is stored in block node 412a, as shown in 514. Block C has its own representative hash and block descriptor stored in block node 412b, as shown in 515. Block C has one page in common with blocks A and B. The pages shared only between blocks A and B are saved in page node 411a, as shown in 520. The page shared among blocks A, B and C is stored in page node 411b, as shown in 530. Thus, as the de-duplication engine receives blocks of data from the storage cluster, the representative hashes are computed for the pages of the received blocks, de-duplicated pages are stored in page nodes referenced by some hash, and block descriptors are stored in block nodes (i.e., list of page for the block are stored), then the de-duplicated blocks of data are stored in the storage cluster.

Figure 6:
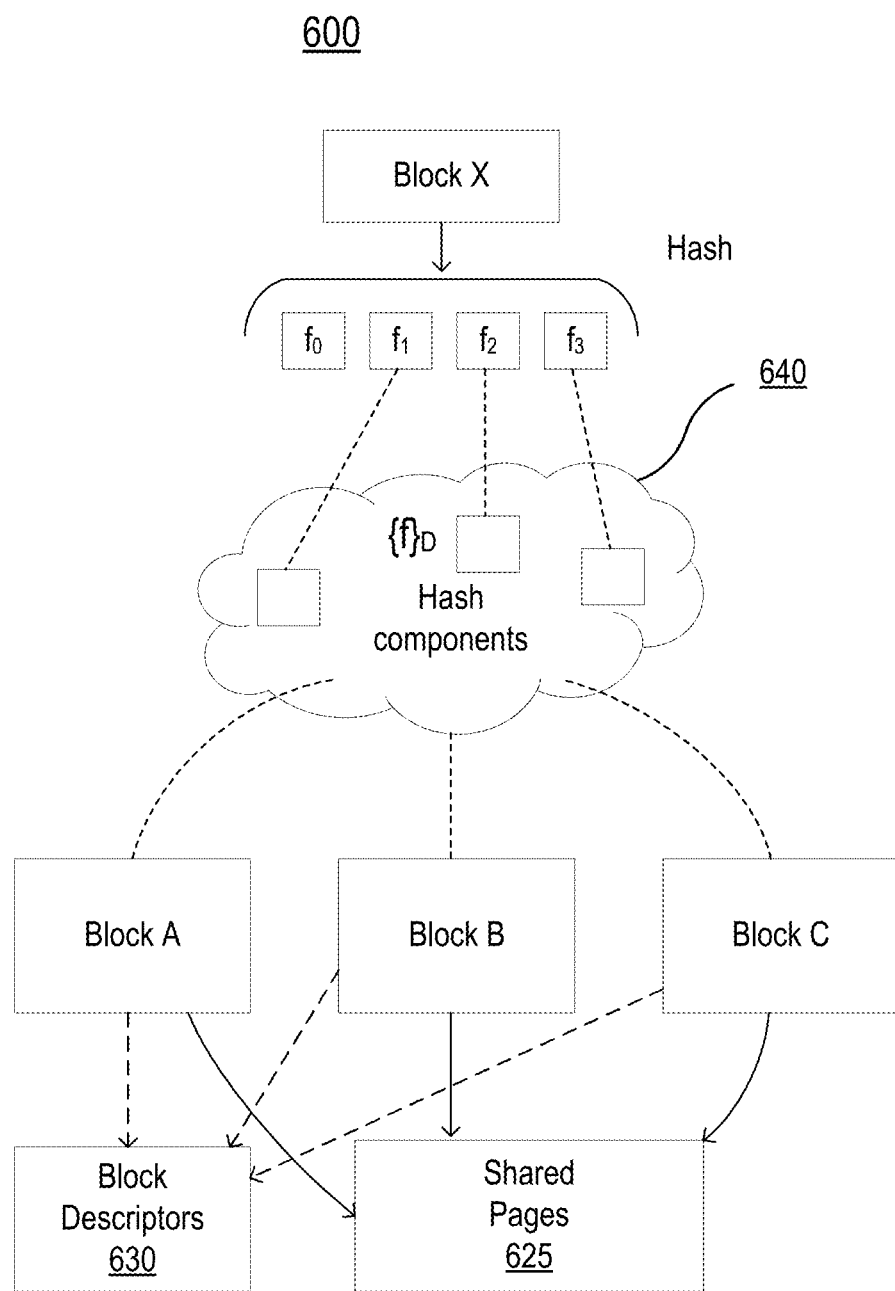
FIG. 6 is an example that illustrates matching blocks having similar content.

FIG. 6 is an example 600 that illustrates matching blocks having similar content. In one aspect, mapper nodes 413a-413n are used for finding similar blocks. In order to be able to properly process newly received blocks for identification of blocks having content similar to content already stored in the de-duplication engine, the de-duplicated pages of previously processed blocks of data are first stored and referenced by some hashes. In addition, the block descriptors of previously processed blocks are stored in block nodes. In other words, the reference pages of previously de-duplicated blocks and the corresponding block descriptors are stored in the de-duplication engine. As new blocks of data are received, the de-duplication engine needs to identify whether the content in the newly received block is similar to some data already stored.

Referring to the example of FIG. 6, the de-duplication engine collects hash components of all blocks already stored in the de-duplication engine. Contents of blocks A, B and C are stored in the de-duplication engine, as shown in 625. Similarly, block descriptors are stored in proper block nodes, as shown in 630. The block descriptors in 630 reference some pages saved somewhere in 625. To facilitate processing of new blocks without duplication, the de-duplication engine collects hash components of hash vectors of all stored blocks. For example, hash components of hash vectors of blocks A, B, and C are collected, as shown in 640.

Let, the set of hash components of all of the blocks stored in the de-duplication engine be represented by $\{f\}_D$. Then, for each newly received block X, the de-duplication engine calculates a hash vector $\{fi\}$. Then, the de-duplication engine determines the number of hash components of the hash vector $\{fi\}$ of block X are contained in $\{f\}_D$. When the number of hash components of vector $\{fi\}$ of block X contained in $\{f\}_D$ exceeds a predetermined threshold value, block X is considered as being similar to already de-duplicated blocks. Then, block X is stored in the de-duplication engine. For the example of FIG. 6, the hash vector of block X has three components matching the elements of $\{f\}_D$. This implies that block X has around 75% of its content in common with content already stored in the de-duplication engine. The de-duplication engine then stores the remaining 25% of the content of block X which is not already stored. The de-duplication engine then updates $\{f\}_D$ to contain any newly added hash components.

The matching of newly received blocks having content similar to content stored in the de-duplication engine, as described above, is possible only after at least some set of de-duplicated blocks are initially stored in the de-duplication engine.

The method of the present disclosure builds the content of the de-duplicated engine by periodically cycling through a coalescing phase and a sedimentation phase. The cycle begins with an initial coalescing phase in which a set of seed blocks that are similar to each other are selected. Then, it proceeds to the sedimentation phase in which newly received blocks are processed to be stored near similar seed blocks.

The set of seed blocks are selected by first creating a counting hash set for storing every hash component of every block that is not de-duplicated.

Then, the method defines a counting set for hash components, wherein an element of the counting set is used for keeping track of a number of identical elements of the counting hash set contained in a counting set instance. For example, for a particular hash component, an element count of q implies that there are q blocks having that particular hash component.

Then, the method, iteratively, for all blocks that are not de-duplicated, looks up element counts for each hash component of the block. For example, if the block has 4 hash components, the method determines an element count for each of the 4 hash components. For the example above, the element count of q implies that there are q−1 other blocks have the same hash component.

Finally, for each block, the method determines whether the block is a seed block based on a first number of the hash components of the block having an element count that reaches a predetermined threshold. For example, if a block has 4 hash components, and 3 of the 4 hash components have an element count of at least 2, the method may select the block as a seed block.

In one aspect, the de-duplication engine monitor service 402 is tasked with: determination of a need to update the set of seed blocks and scheduling of a particular phase (i.e., scheduling either the coalescing phase or the sedimentation phase).

To facilitate the cycling through the two phases described above, and the scheduling of particular phases, the monitor service 402 assigns increasing sequence numbers called the operation epoch to the current operating phase. Then, all messages exchanged between various participants of the de-duplication engine include the current operating phase and the operation epoch. That is, every mapper node, page node, block node, etc., communicates with other components of the de-duplication engine with messages that include both the operation epoch and the current operating phase. In turn, the recipient of the message verifies whether the operation epoch matches its own. If the received epoch is behind the operation epoch of the recipient, the message is rejected and an error message is sent to the sender. Therefore, the sender of the message is notified of the mismatch. Upon being notified, the sender of the message may query the monitor service for the current operating phase. If the received epoch is ahead of the operation epoch of the recipient, the recipient sends a query to the monitor service to determine the current operating phase. Thus, if there is a mismatch, based on whether the sender or the recipient is ahead, the entity that is behind queries the monitor service for the current operating phase.

Figure 7:
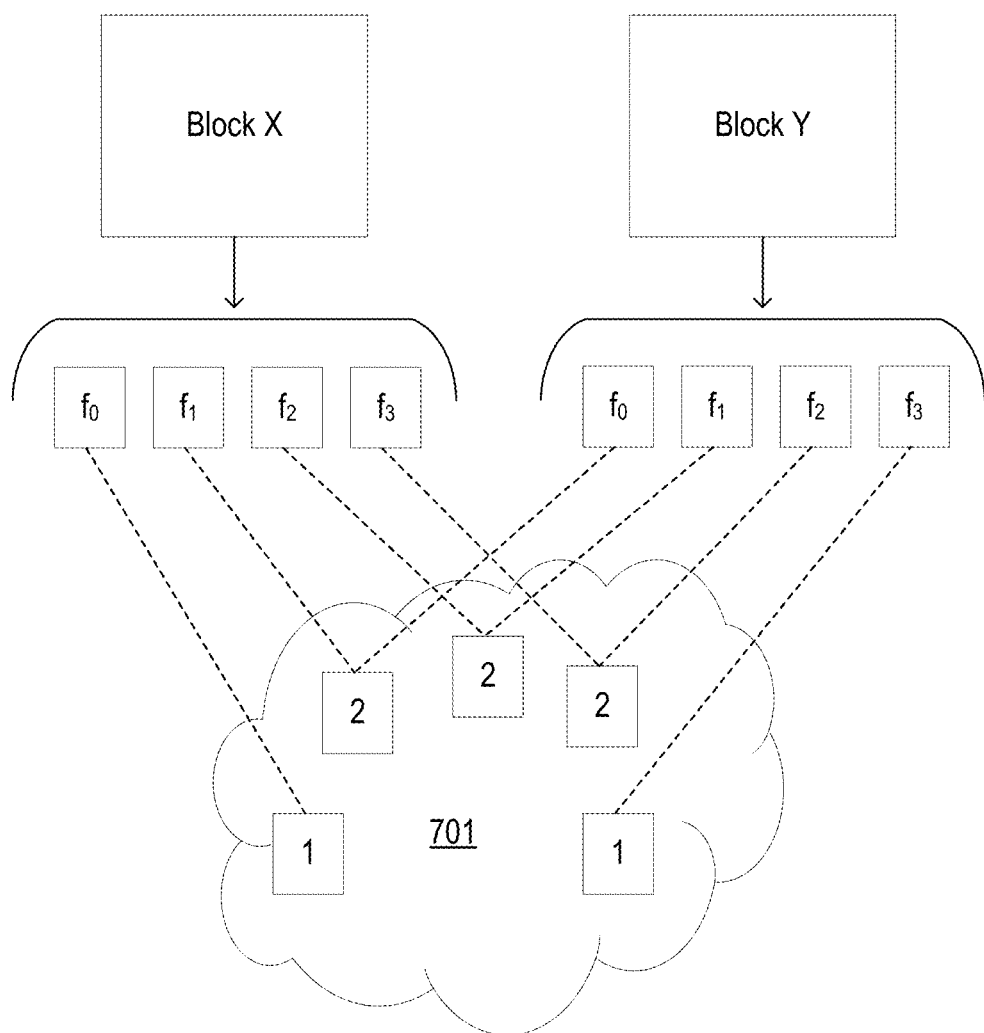
FIG. 7 is an example that illustrates a coalescing phase for seed block selection.

FIG. 7 is an example 700 that illustrates a coalescing phase for seed block selection. For example, suppose the method receives two similar data blocks X and Y during an initial coalescing phase. First, a counting hash set is created for containing all hash components for blocks X and Y. As shown in 701, 3 of the 4 hash components of block X (namely, f1, f2 and f3) have element counts of 2. Similarly, 3 of the 4 hash components of block Y (namely, f0, f1 and f2) have element counts of 2. If the first number is defined as 3 and the predetermined threshold is 2, a block will be a seed block if 3 of the hash components have an element count that reaches 2. Based on this condition, both blocks X and Y are added to the set of seed blocks.

In one aspect, the first number is configured by the de-duplication engine monitor based on at least one of: a length of time since the set of seed blocks has been updated, and a performance measurement of the set of seed blocks.

In one aspect, the performance measurement of the set of seed blocks is made for determination of a need to expand the set based on a sample of newly received blocks and a similarity of the sample of newly received blocks to the current seed blocks.

In one aspect, the set of seed blocks is updated in accordance with a predetermined schedule. In one aspect, during the coalescing phases, de-duplicated blocks are either absent or ignored.

Returning to FIG. 6, as described above, the matches between hashes of various blocks are used for the de-duplication effort. There are various techniques for performing comparisons among hashes; however, most such techniques are not scalable. For example, Bloom filters are commonly used for space-efficient approximate representations of large sets.

For ease of understanding, first a summary of a typical use of Bloom filters is described herein. Suppose the set of numbers {xi} are to be represented using a bitmap having N bits. Then, for every xi, M different hash functions, hj(xi), may be calculated. For every calculated hash, a bit with index hj(xi) mod N may be located and set it to 1. In order to test if some number y is in the set, M hash functions hj(y) may be computed and tested to determine whether all bits with indexes hj(y) mod N are all equal to 1. This routine may give false positive results but never gives false negative results. The probability of a false positive result depends on the number of elements in the set, the number of bits N, and the number of hash functions. The minimal false positive probability is reached when the total number of bits set is equal to half of the total number of bits N. For example, a reasonable accuracy is achieved while using 1 byte (8 bits) per every set element, and M=4 hash functions.

Returning to the de-duplication engine, suppose a Bloom filter similar to the one described above is to be used for finding similar blocks, one can create a Bloom filter with a number of bits sufficient for representing the set of hash components of all data blocks in the storage. However, the design requires at least 4 GB of bitmap storage, per 1 PB of data storage ($10^{15}$ bytes) using 1 MB sized blocks. This implies that for large scale storage, the size of the required bitmap for the bloom filter may easily exceed the size of a RAM of a single physical server. Thus, there is a need to modify how the Bloom filter is to be used for an application in which scalability is desired.

Figure 8:
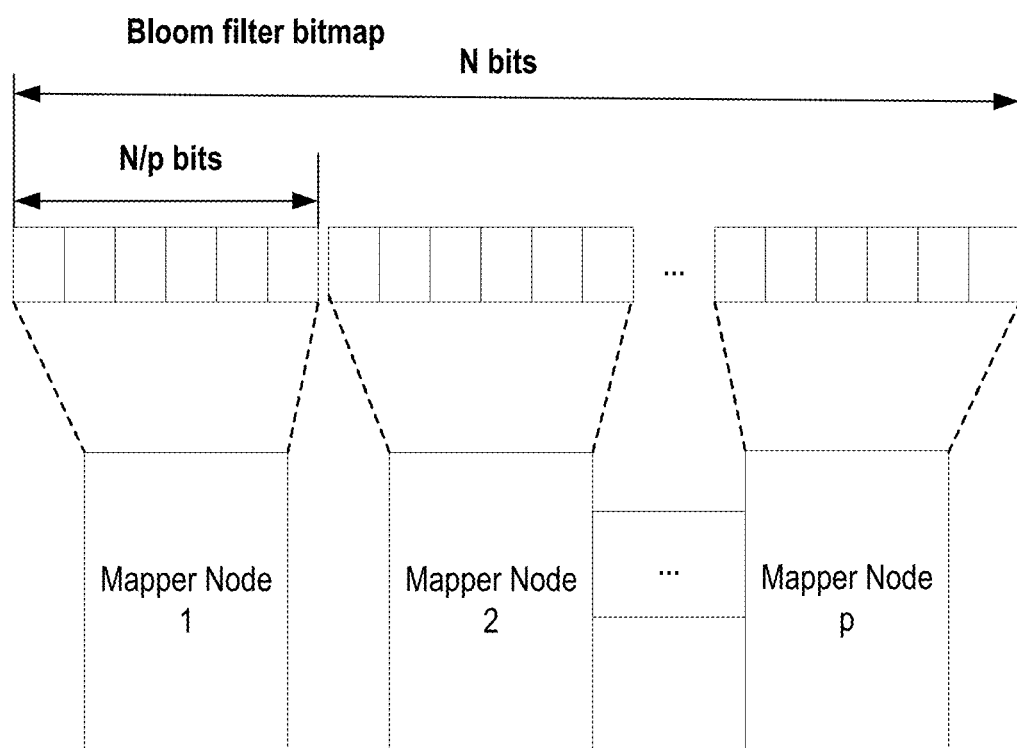
FIG. 8 illustrates an exemplary scalable Bloom filter.

In one aspect, the method of the present disclosure addresses the scalability problem and the RAM size limitations of the single physical server by creating a scalable Bloom filter. FIG. 8 illustrates an exemplary scalable Bloom filter 800.

In one aspect, the creation of the scalable Bloom filter includes: determining a size of a Bloom filter bitmap, N, needed for the de-duplication engine based on amount of data stored in a cluster; determining a number of ranges, P, based on the size of the Bloom filter map and a number of bits needed for processing data, simultaneously, by a single physical server of the de-duplication engine; and splitting the Bloom filter bitmap onto the determined number of ranges, each range being served by a unique mapper node and having the number of bits for processing data by the single physical server. Suppose the Bloom filter bitmap includes N bits, then, the number of ranges is P with each range having N/P bits. As shown in FIG. 8, the Bloom filter 800 has P mapper nodes and P ranges, with each bitmap range being served by a corresponding separate instance of a mapper node.

In one aspect, the creation of the scalable Bloom filter further includes: delivering a current system configuration that includes the Bloom filter configuration to every component of the de-duplication engine. In one aspect, the configuration includes a number of bits per mapper node and a number of ranges. In other words, every component that needs the Bloom filter configuration received the configuration from the monitor service 402 or the management system 104, as applicable. Then, given this information, every component of the storage of the de-duplication engine may access the bloom filter ranges via an interface provided by a corresponding mapper node instance.

In one aspect, the number of bits per mapper node is set based on a size of a Random Access Memory (RAM) of the physical server.

In one aspect, the scalable Bloom filter is created by the management system 104, as shown in FIG. 1, or by the de-duplication engine monitor service 402, as shown in FIG. 4. Note that, based on implementation, the de-duplication engine monitor service may be part of the management system. The mapper node is responsible for creating the bitmap range, initializing the content of the range, setting and checking bits on behalf of client requests, and finally deallocating the bitmap range.

In one aspect, the seed block selection described above in conjunction with FIG. 7 is performed using a Bloom filter as follows. In order to select the seed blocks using the Bloom filter, first, a counting Bloom filter is defined having a set of counters, with each counter having a group of r-bits. Each group of r-bits of a particular counter is then used to represent an exact number of hash components mapped to the particular counter.

Figure 9:
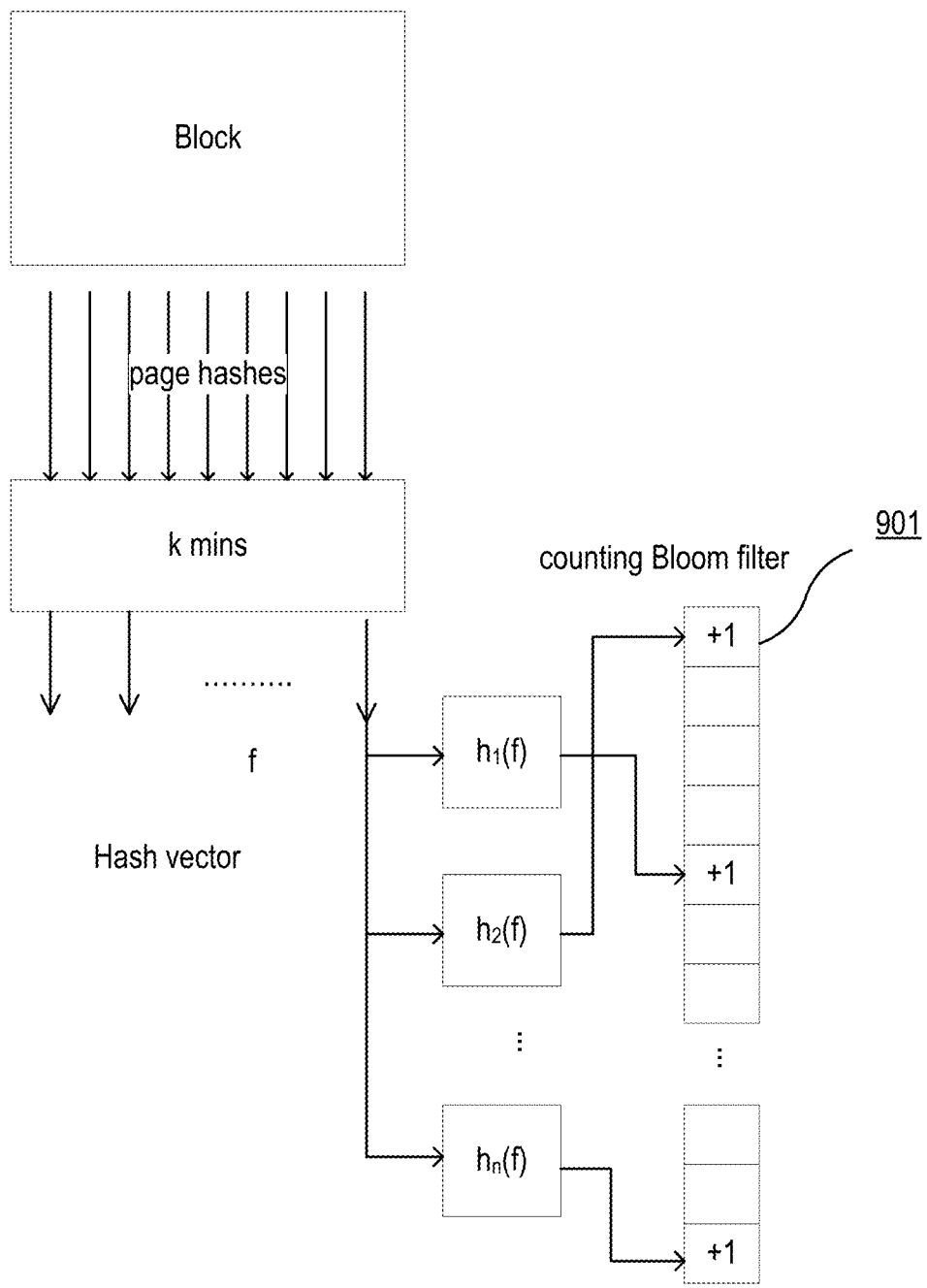
FIG. 9 illustrates an example of a process of adding block hashes to a counting bloom filter.

FIG. 9 illustrates an example of a process of adding block hashes to a counting bloom filter. The hash components $h_1(f), h_2(f), \ldots, h_n(f)$ are added to the counting Bloom filter, as shown in 901. In order to determine a number of occurrences of a particular hash component y, the method may locate a minimum value of the counters in positions $h_j(y)$ mod N, for all M hash functions used to build the Bloom filter.

It is noted that the counter may reach a maximum value. For instance, for r bits, the counter may reach a maximum value of $2^r-1$. Then, the counter is no longer able to be incremented. For instance, if the counter has 2 bits, it may have values of 0, 1, 2, 3. After the value of three, the counter is simply stuck.

The method of the present disclosure, as described above, de-duplicates blocks of data to ensure content is stored only once. However, at times, a previously stored block may no longer be needed.

In one aspect, the method of the present disclosure also removes data and objects of the de-duplication engine that are no longer needed. In one aspect, the de-duplication engine monitor service 402 periodically schedules a cleaning phase for removing objects of the de-duplication engine that are no longer needed.

In one aspect, the mapper nodes 413a-413n are used for removing data and objects that are no longer needed.

In one aspect, the cleaning comprises maintaining a reference counter for each object and releasing the object whenever the reference counter drops to zero. However, maintaining counters for each possible object in a distributed system is complex and resource intensive.

In another aspect, the cleaning is performed without maintaining counters for each object, as follows. In one aspect, the cleaning comprises performing, by the mapper node, the following three stages sequentially, wherein, in a first stage, each reference source adds all reference target hashes of the reference source to a reference set represented by a Bloom filter instance; in a second stage, each possible reference target looks up its respective hash in the reference set to determine whether or not the hash is referenced by at least one reference source; and in a third stage, the mapper node removes reference targets having hashes that are not found in the reference set.

Figure 10:
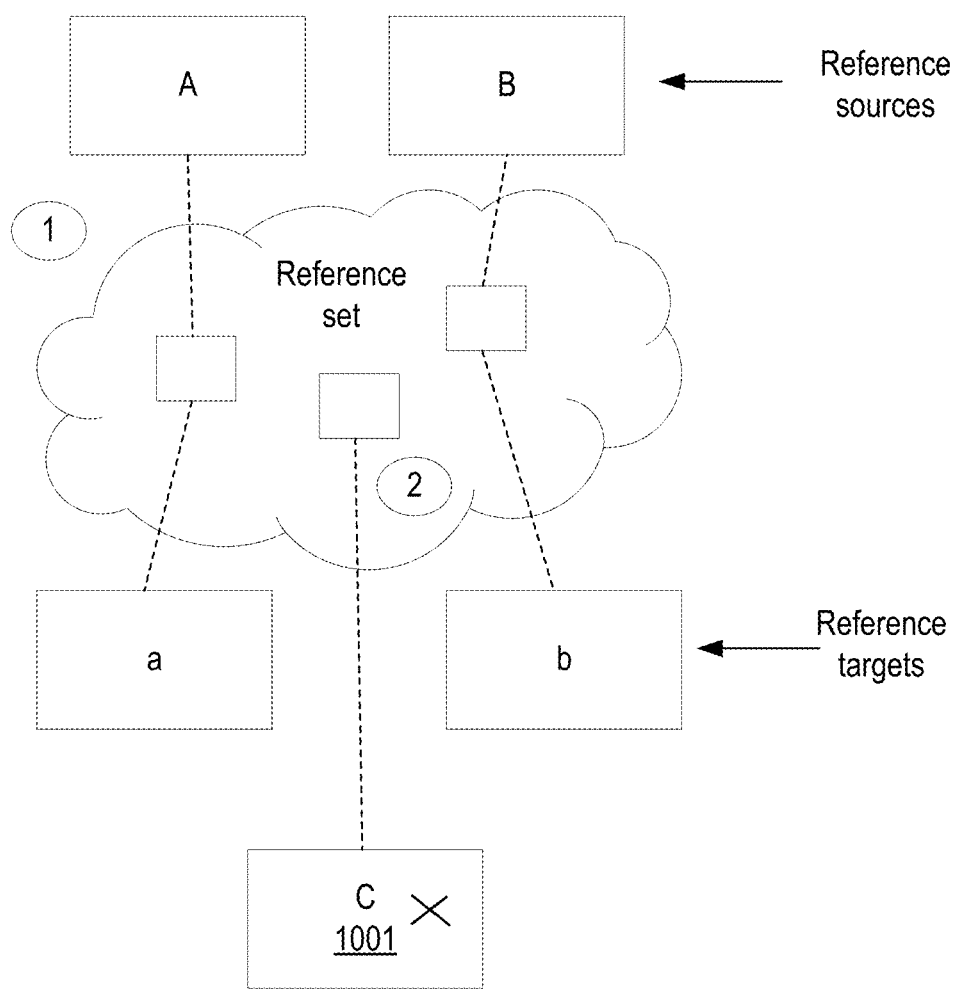
FIG. 10 illustrates an example in which unreferenced objects are removed.

FIG. 10 illustrates an example in which unreferenced objects are removed. As shown in FIG. 10, reference targets a and b are referenced. In contrast, reference target c is not needed and hence it is removed.

In one aspect, the objects for which the cleaning phase is scheduled includes at least block nodes and page nodes.

In one aspect, the cleaning phase is scheduled in relation to a schedule of a coalescing phase. For example, the cleaning may be performed prior to updating of seed blocks, immediately after the updating of seed blocks, etc.

In one aspect, the cleaning phase is scheduled per a predetermined number of cycles between the coalescing and sedimentation phases. For example, one cleaning phase may be scheduled for every 10 cycles between the coalescing and sedimentation phases.

Figure 11:
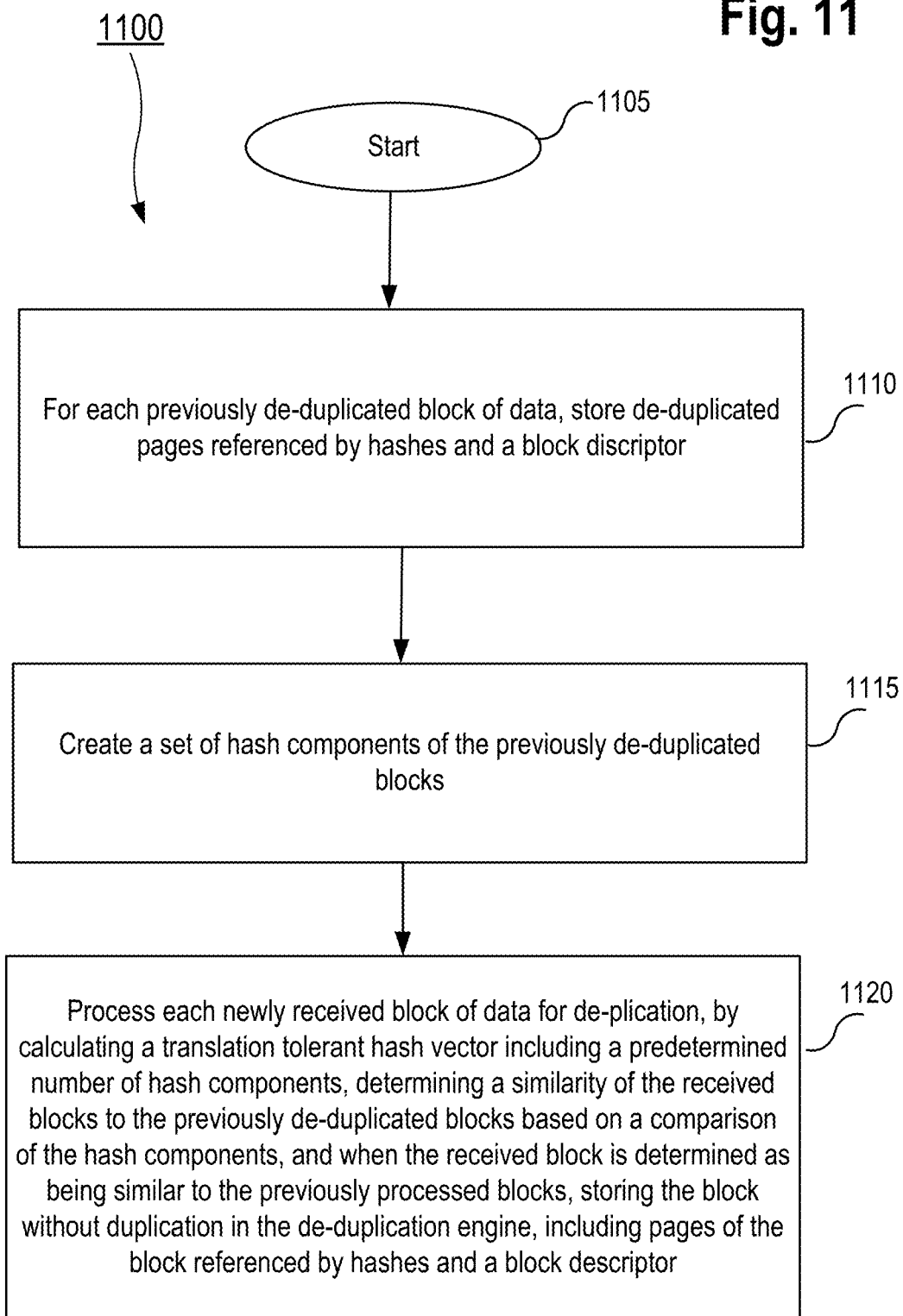
FIG. 11 illustrates a flow diagram of a method for de-duplicating blocks of data in accordance with aspects of the present disclosure.

FIG. 11 illustrates a flow diagram of a method 1100 for de-duplicating blocks of data in accordance with aspects of the present disclosure. Method 1100 stars in step 1105 and proceeds to step 1110.

In step 1110, method 1100, for each previously de-duplicated block of data of a de-duplication engine, stores de-duplicated pages references by hashes and a block descriptor.

In step 1115, method 1100, creates a set of hash components of the previously de-duplicated blocks.

In step 1120, method 1100, processes each newly received block of data for de-duplication. The processing of the newly received block includes: calculating a translation tolerant hash vector including a predetermined number of hash components, determining a similarity of the received block to the previously de-duplicated blocks based on a comparison of the hash components of the received block with the hash components in the set, and when the received block is determined as being similar to the previously processed blocks based on the comparison, storing the block without duplication in the de-duplication engine, including pages of the block referenced by hashes and a block descriptor.

In one aspect, the received block is determined as being similar to the previously processed blocks when the number of hash components of the received block contained in the set of hash components exceeds a predetermined threshold.

In one aspect, the predetermined number of hash components are evenly distributed by stripping high order bits from hashes of pages, and selecting the predetermined number of hash components based on remaining bits of the hashes.

In one aspect, the de-duplication engine is scalable.

In one aspect, each block consists multiple pages. For example, the block of data may contain 256 pages, making each block about 1 Mbyte in size.

In one aspect, the similarity of the received block with previously processed blocks is determined using a scalable Bloom filter.

In one aspect, the method further includes periodically removing data and objects of the de-duplication engine that are no longer needed.

In one aspect, the method further includes updating the set of hash components when the received block is added to a storage of the de-duplicated engine.

Figure 12:
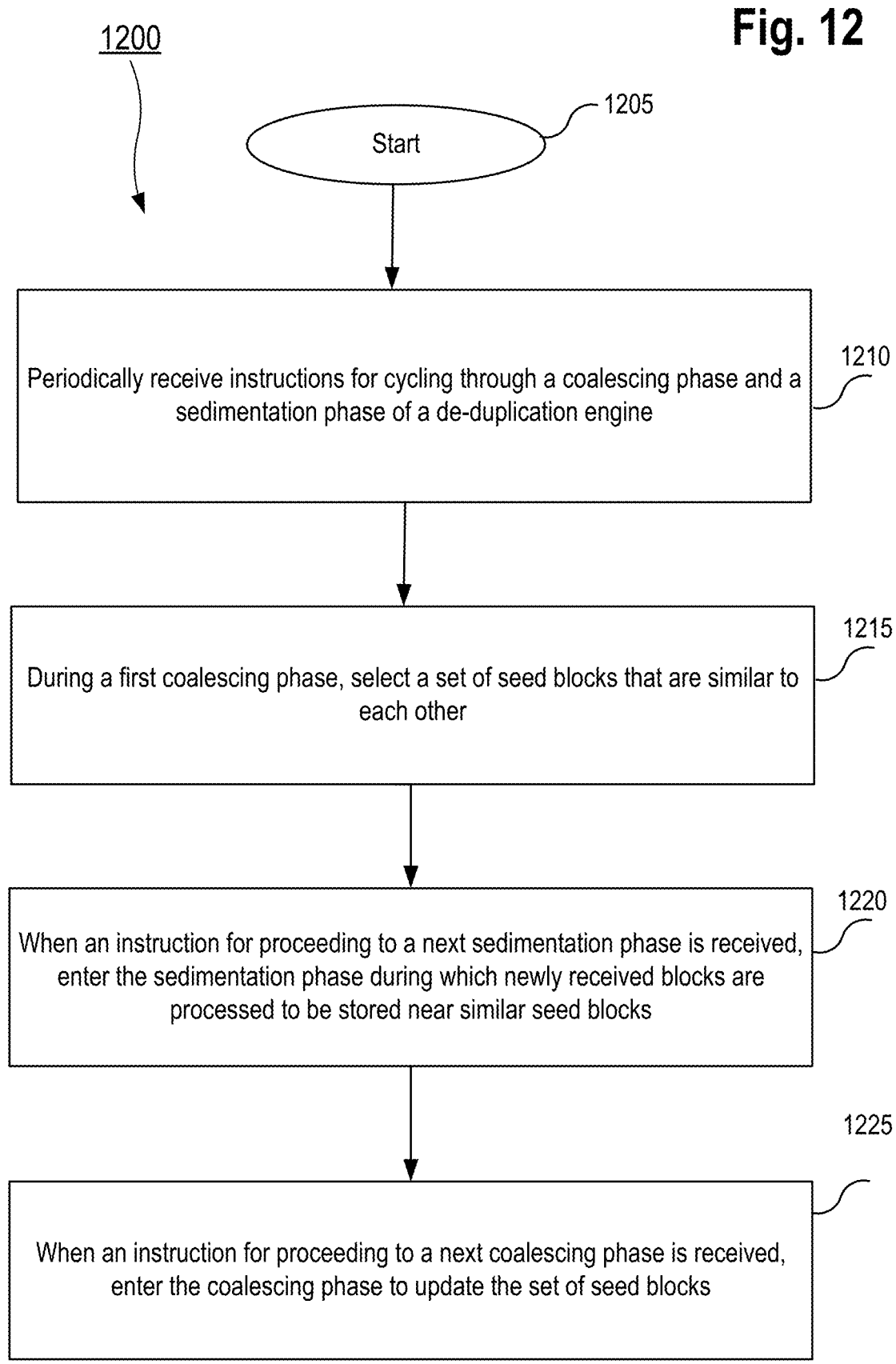
FIG. 12 illustrates a flow diagram of a method for building content for a de-duplication engine in accordance with aspects of the present disclosure.

FIG. 12 illustrates a flow diagram of a method 1200 for building content for a de-duplication engine in accordance with aspects of the present disclosure. Method 1200 starts in step 1205 and proceeds to step 1210.

In step 1210, method 1200 periodically receives instructions for cycling through a coalescing phase and a sedimentation phase of the de-duplication engine.

In step 1215, method 1200, during a first coalescing phase, selects a set of seed blocks that are similar to each other;

In step 1220, method 1200, when an instruction for proceeding to a next sedimentation phase is received, enters the sedimentation phase during which newly received blocks are processed to be stored near similar seed blocks; and In step 1225, method 1200, when an instruction to proceed to a next coalescing phase is received, enters the coalescing phase to update the set of seed blocks.

In one aspect, the selection of the set of seed blocks comprises: creating a counting hash set for storing every hash component of every block that is not de-duplicated;

defining a counting set for hash components, wherein an element of the counting set is used for keeping track of a number of identical elements of the counting hash set contained in a counting set instance; iteratively, for all blocks that are not de-duplicated, looking up element counts for each hash component of the block; and for each block, determining that the block is a seed block when a first number of the hash components of the block have an element count that reaches a predetermined threshold.

In one aspect, the first number is configured based on at least one of: a length of time since the set of seed blocks has been updated, and a performance measurement of the set of seed blocks.

In one aspect, the performance measurement is made for determination of a need to expand the set of seed blocks, the measurement being based on a similarity of a sample of newly received blocks to a current set of seed blocks.

In one aspect, the instructions for cycling through a coalescing phase and a sedimentation phase of the de-duplication engine are received from a monitor of the de-duplication engine.

In one aspect, the monitor of the de-duplication engine assigns an increasing sequence number to a current operating phase.

In one aspect, the cycling further includes a cleaning phase in which data and objects no longer needed are removed from the de-duplication engine.

The scalable offline de-duplication method and system of the present disclosure, as described above, has several advantaged. First, the de-duplication system of the present disclosure may be used for large blocks of data (e.g., 1 Mbyte in size) as compared to the much smaller blocks of data (e.g., 4K bytes in size) used by standard offline de-duplication systems. In addition, the architecture of the de-duplication engine of the present disclosure is scalable. Thus, the de-duplication engine of the present disclosure is able to accommodate data from a large storage system. As a larger engine is needed, the capacity of the de-duplication engine may be increased by adding more server components and storage capacity. Moreover, the de-duplication of the present disclosure uses a scalable bloom filter for finding similar data blocks. Yet another advantage is that the de-duplication engine of the present disclosure may be configured to perform various tasks at different operational phases. For example, the configuration may be for tasks such as: to collect duplicated content, to remove data that is no longer needed, and the like.

FIG. 13 is a block diagram illustrating a computer system 20 on which aspects of systems and methods for de-duplicating blocks of data offline or for building content for the de-duplication engine may be implemented in accordance with an exemplary aspect. It should be noted that the computer system 20 can correspond to elements of the de-duplication engine 401, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for de-duplicating blocks of data, the method comprising:
   receiving a block of data at a de-duplication engine that comprises a first block node and a first page node, wherein the first block node stores a single block descriptor for at least two identical blocks previously received and wherein the first page node stores single instances of identical pages in the at least two identical blocks;
   comparing the received block with the at least two identical blocks;

in response to determining that the received block partially matches the at least two identical blocks:
storing a block descriptor of the received block in a second block node of the de-duplication engine;
storing at least one page that matches between the received block and the at least two identical blocks in a second page node of the de-duplication engine; and
storing at least one page that does not match between the received block and the at least two identical blocks in a third page node of the de-duplication engine.

2. The method of claim 1, wherein storing at least one page that matches between the received block and the at least two identical blocks in a second page node of the de-duplication engine further comprises:
removing the at least one page that matches from the first page node.

3. The method of claim 1, wherein comparing the received block with the at least two identical blocks comprises:
creating a set of hash components of the at least two identical blocks; and
calculating a translation tolerant hash vector including a predetermined number of hash components of the received block; and
determining a similarity of the received block to the at least two identical blocks based on a comparison of the hash components of the received block with the hash components in the set.

4. The method of claim 3, wherein the received block is determined as being similar to the at least two identical blocks when the number of hash components of the received block contained in the set of hash components exceeds a predetermined threshold.

5. The method of claim 3, wherein the predetermined number of hash components are evenly distributed by stripping high order bits from hashes of pages, and selecting the predetermined number of hash components based on remaining bits of the hashes.

6. The method of claim 3, further comprising updating the set of hash components when the received block is added to a storage of the de-duplicated engine.

7. The method of claim 1, wherein the de-duplication engine is scalable.

8. The method of claim 1, wherein the comparing is performed by a mapper node of the de-duplication engine.

9. The method of claim 1, wherein the comparing of the received block with the at least two identical blocks is performed using a scalable Bloom filter.

10. The method of claim 1, further comprising periodically removing data and objects of the de-duplication engine that are no longer needed.

11. A system for de-duplicating blocks of data, the system comprising:
at least one processor configured to:
receive a block of data at a de-duplication engine that comprises a first block node and a first page node, wherein the first block node stores a single block descriptor for at least two identical blocks previously received and wherein the first page node stores single instances of identical pages in the at least two identical blocks;
compare the received block with the at least two identical blocks;
in response to determining that the received block partially matches the at least two identical blocks:
store a block descriptor of the received block in a second block node of the de-duplication engine;
store at least one page that matches between the received block and the at least two identical blocks in a second page node of the de-duplication engine; and
store at least one page that does not match between the received block and the at least two identical blocks in a third page node of the de-duplication engine.

12. The system of claim 11, wherein the at least one processor is configured to store at least one page that matches between the received block and the at least two identical blocks in a second page node of the de-duplication engine by:
removing the at least one page that matches from the first page node.

13. The system of claim 11, wherein the at least one processor is configured to comparing the received block with the at least two identical blocks by:
creating a set of hash components of the at least two identical blocks; and
calculating a translation tolerant hash vector including a predetermined number of hash components of the received block; and
determining a similarity of the received block to the at least two identical blocks based on a comparison of the hash components of the received block with the hash components in the set.

14. The system of claim 13, wherein the received block is determined as being similar to the at least two identical blocks when the number of hash components of the received block contained in the set of hash components exceeds a predetermined threshold.

15. The system of claim 13, wherein the predetermined number of hash components are evenly distributed by stripping high order bits from hashes of pages, and selecting the predetermined number of hash components based on remaining bits of the hashes.

16. The system of claim 13, wherein the at least one processor is configured to update the set of hash components when the received block is added to a storage of the de-duplicated engine.

17. The system of claim 11, wherein the de-duplication engine is scalable.

18. The system of claim 11, wherein the comparing is performed by a mapper node of the de-duplication engine.

19. The system of claim 11, wherein the comparing of the received block with the at least two identical blocks is performed using a scalable Bloom filter.

20. A non-transitory computer readable medium storing thereon computer executable instructions for de-duplicating blocks of data, including instructions for:
receiving a block of data at a de-duplication engine that comprises a first block node and a first page node, wherein the first block node stores a single block descriptor for at least two identical blocks previously received and wherein the first page node stores single instances of identical pages in the at least two identical blocks;
comparing the received block with the at least two identical blocks;
in response to determining that the received block partially matches the at least two identical blocks:
storing a block descriptor of the received block in a second block node of the de-duplication engine;

storing at least one page that matches between the received block and the at least two identical blocks in a second page node of the de-duplication engine; and storing at least one page that does not match between the received block and the at least two identical blocks in a third page node of the de-duplication engine.

\* \* \* \* \*